(12) United States Patent
Yang et al.

(10) Patent No.: US 8,605,420 B2
(45) Date of Patent: Dec. 10, 2013

(54) HINGE MODULE AND PORTABLE ELECTRONIC DEVICE USING THE SAME

(75) Inventors: Che-Sheng Yang, New Taipei (TW); Chin-Lung Fan, New Taipei (TW)

(73) Assignee: Wistron Corporation, New Taipei (TW)

( * ) Notice: Subject to any disclaimer, the term of this patent is extended or adjusted under 35 U.S.C. 154(b) by 162 days.

(21) Appl. No.: 13/368,551

(22) Filed: Feb. 8, 2012

(65) Prior Publication Data
US 2013/0050916 A1 Feb. 28, 2013

(30) Foreign Application Priority Data

Aug. 31, 2011 (TW) .............................. 100216274 U

(51) Int. Cl.
*G06F 1/16* (2006.01)
(52) U.S. Cl.
USPC ................... 361/679.27; 16/382; 312/334.47; 455/575.8; 345/168
(58) Field of Classification Search
USPC ........... 16/250, 298, 319, 344, 273, 382, 378, 16/91; 361/679.01, 679.02, 679.21, 361/679.22, 679.27, 679.28, 679.3, 679.32, 361/679.33, 679.41, 679.43, 679.48, 361/679.52, 679.54, 679.55, 679.56, 361/679.15; 312/257.1, 405, 334.29, 312/334.47, 334.1, 223.2, 223.3, 223.1, 312/404, 321.5; 455/566, 575.1, 575.3, 455/575.4, 575.8; 345/169, 905, 573.1, 345/168, 156, 204

See application file for complete search history.

(56) References Cited

U.S. PATENT DOCUMENTS

| 7,669,289 B2 * | 3/2010 | Shih et al. ........................ 16/367 |
| 2007/0294962 A1 * | 12/2007 | Pumford et al. ................. 52/116 |
| 2011/0173775 A1 * | 7/2011 | Chen et al. ....................... 16/335 |

* cited by examiner

*Primary Examiner* — Hung Duong
(74) *Attorney, Agent, or Firm* — McClure, Qualey & Rodack, LLP

(57) ABSTRACT

A hinge module and a portable electronic device using the same are provided. The hinge module includes a hinge body, a protruding portion, a column and a sleeve. The protruding portion is coupled to and protrudes from the hinge body. The column is coupled to and protrudes from the protruding portion. The sleeve has a connecting portion and a threaded stud portion which are connected together. The connecting portion has a receiving tank and a helix groove which are connected together. The protruding portion is disposed in the receiving tank. The column is disposed in and slides in the helix groove. When the column slides along the helix groove, the sleeve is rotated with respect to the protruding portion.

12 Claims, 7 Drawing Sheets

HINGE MODULE AND PORTABLE ELECTRONIC DEVICE USING THE SAME

This application claims the benefit of Taiwan application Serial No. 100216274, filed Aug. 31, 2011, the subject matter of which is incorporated herein by reference.

BACKGROUND OF THE INVENTION

1. Field of the Invention

The invention relates in general to a hinge module and a portable electronic device using the same, and more particularly to a hinge module for connecting two modules and a portable electronic device using the same.

2. Description of the Related Art

As market competition is intensified, the production capacity of electronic product has become a critical issue to every manufacturer. In general, the production capacity can be increased through the increase in manpower, production equipment or yield rate. Alternatively, the production capacity of electronic product can be increased by simplifying the processes of assembling the electronic products as to further reduce production hours. Let the notebook computer be taken as an example. A notebook computer is composed of many components, and most of the components are assembled together through screws. The assembly process of notebook computer includes several steps such as picking up elements, preparing locking tools, and locking elements. Due to the preparation of the locking tool and the locking elements and the storage of various locking elements, the assembly of notebook computer is time consuming and requires considerable manpower and costs. Therefore, how to simplify the assembly process of notebook computer so as to correspondingly increase the production capacity has become a prominent task for the industries.

SUMMARY OF THE INVENTION

The invention is directed to a hinge module and a portable electronic device using the same which increase assembly efficiency with the cooperation of a protruding portion, a column and a sleeve so as to effectively increase production capacity.

According to one embodiment of the present invention, a hinge module including a hinge body, a protruding portion, a column and a sleeve is provided. The protruding portion is coupled to and protrudes from the hinge body. The column is coupled to and protrudes from the protruding portion. The sleeve has a connecting portion and a threaded stud portion which are connected together. The connecting portion has a receiving tank and a helix groove which are connected together. The protruding portion is disposed in the receiving tank. The column is disposed in and slides in the helix groove. When the column slides along the helix groove, the sleeve is rotated with respect to the protruding portion.

According to an alternate embodiment of the present invention, a portable electronic device including a first mechanism, a second mechanism and a hinge module is provided. The hinge module includes a hinge body, a protruding portion, a column and a sleeve. The hinge body is coupled to the first mechanism. The protruding portion is coupled to and protrudes from the hinge body. The column is coupled to and protrudes from the protruding portion. The sleeve has a connecting portion and a threaded stud portion which are connected together. The connecting portion has a receiving tank and a helix groove which are connected together. The protruding portion is received in the receiving tank. The column is disposed in and slides in the helix groove. When the column slides along the helix groove, the sleeve is rotated with respect to the protruding portion, so that the threaded stud portion of the sleeve is locked with the second mechanism or is released from the locking state with the second mechanism.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
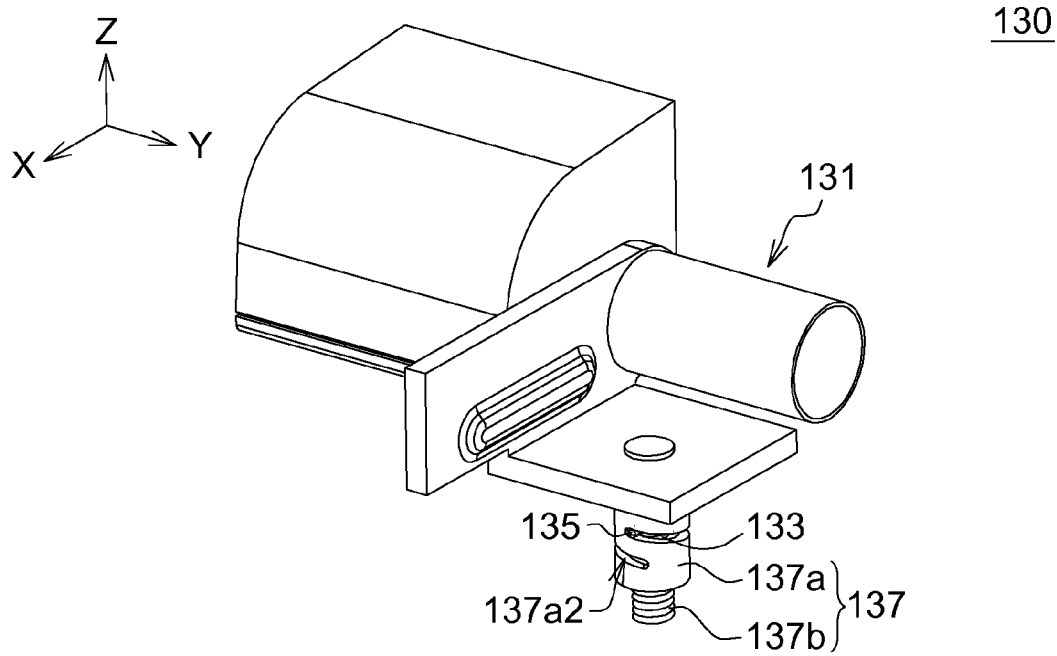
FIG. 1A and FIG. 1B show assembly diagrams of a hinge module according to an embodiment of the invention in different states.
Figure 1B:
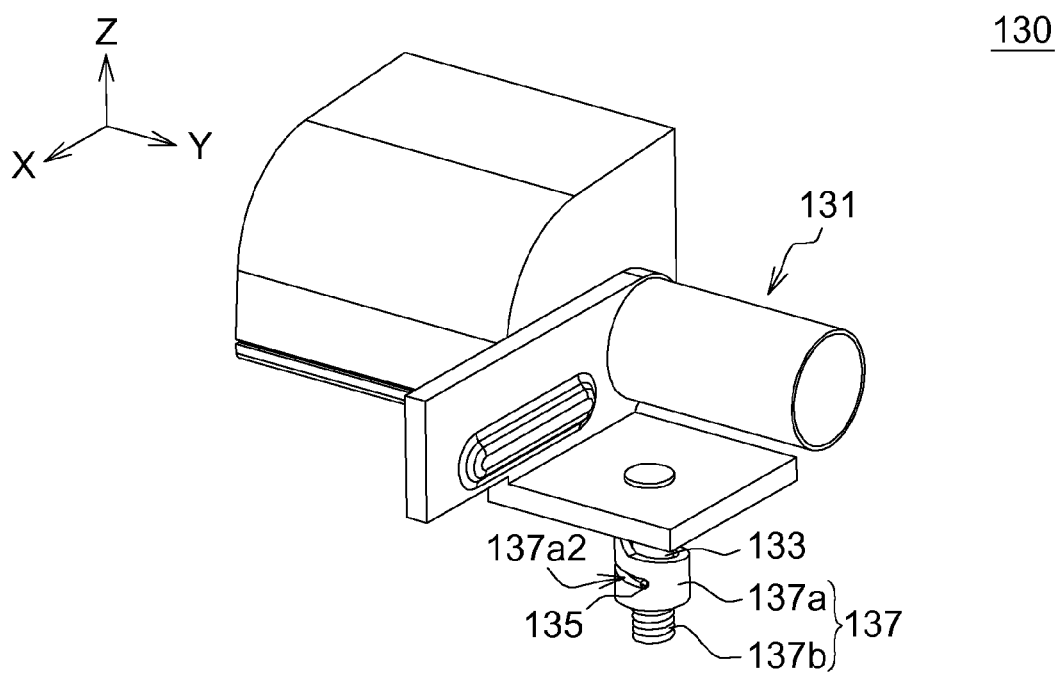
Figure 2:
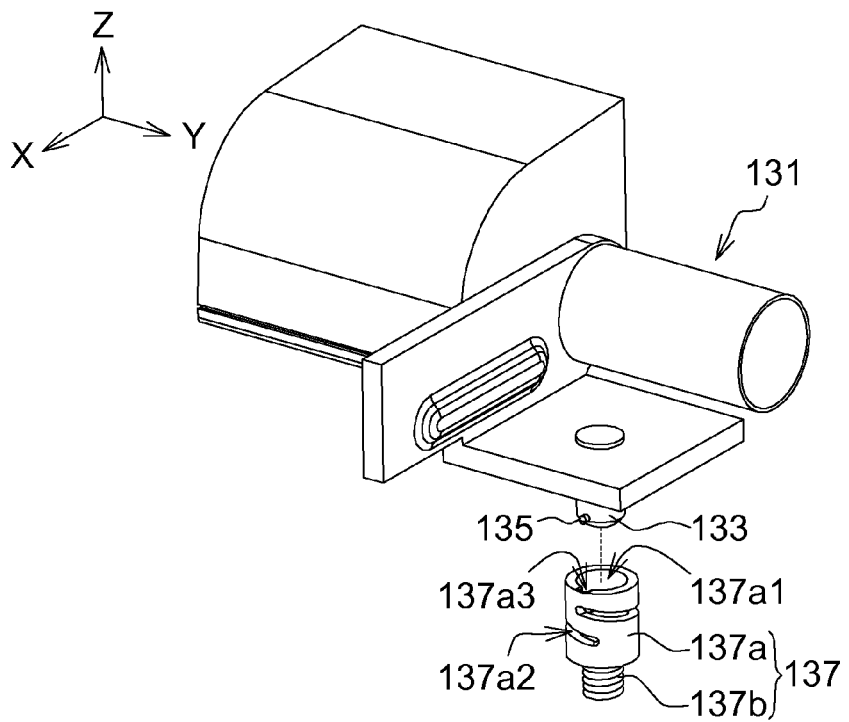
FIG. 2 shows an exploration diagram of the hinge module of FIGS. 1A and 1B.

Referring to FIGS. 1A and 1B and FIG. 2. FIGS. 1A and 1B show assembly diagrams of a hinge module according to an embodiment of the invention in different states. FIG. 2 shows an exploration diagram of the hinge module of FIGS. 1A and 1B.

The hinge module 130 includes a hinge body 131, a protruding portion 133, a column 135 and a sleeve 137. The protruding portion 133 is coupled to and protrudes from the hinge body 131. The column 135 is coupled to and protrudes from the protruding portion 133. The sleeve 137 has a connecting portion 137a and a threaded stud portion 137b which are connected together. The connecting portion 137a has a receiving tank 137a1 and a helix groove 137a2 which are connected together. The protruding portion 133 is received in the receiving tank 137a1. The column 135 is disposed in and slides in the helix groove 137a2.

When the assembly personnel applies a force to the hinge body 131 along the +Z-axis or the −Z-axis direction, the column 135 slides along the helix groove 137a2. When the column 135 slides along the helix groove 137a2, the sleeve 137 is rotated with respect to the protruding portion 133. That is, the threaded stud portion 137b of the sleeve 137 can be rotated and locked on other object or rotated and released from the locking state with other object.

In the present embodiment of the invention, the column 135 protrudes from the protruding portion 133 in a direction substantially perpendicular to the direction in which the protruding portion 133 protrudes from the hinge body 131. That is, in the example that the column 135 extends on the XY plane and protrudes from the protruding portion 133, the protruding portion 133 protrudes from the hinge body 133 in the −Z-axis direction, so that the protruding direction of the column 135 is perpendicular to that of the protruding portion 133. Also, the helix groove 137a2 surrounds the peripheral of the receiving tank 137a1. Thus, when the protruding portion 133 is disposed on the receiving tank 137a1, the column 135 extending and protruding from the lateral sides of the protruding portion 133 is disposed in the helix groove 137a2.

Figure 3:
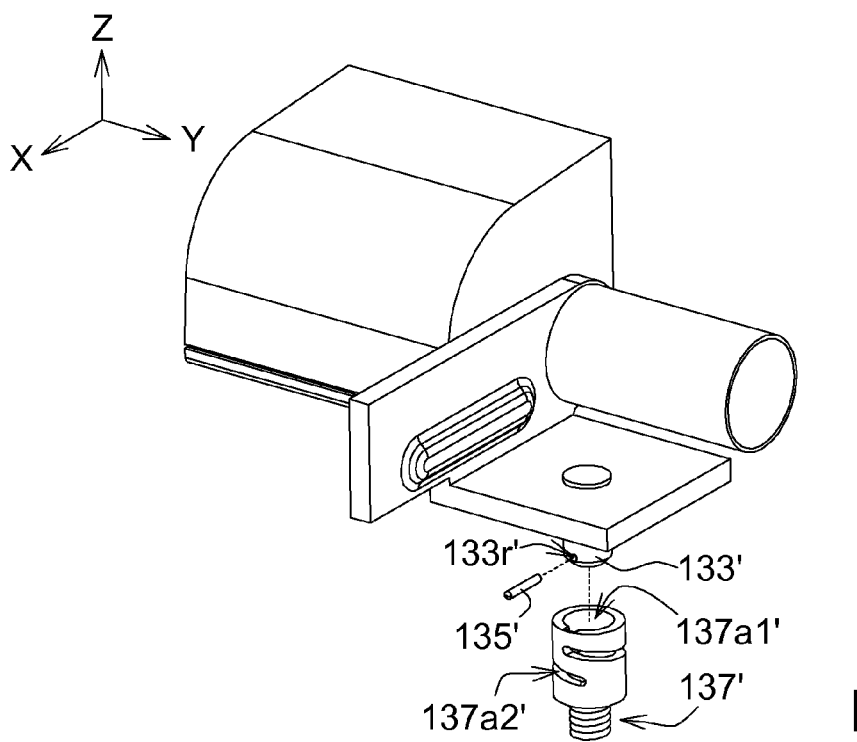
FIG. 3 shows an exploration diagram of a hinge module according to an alternate embodiment of the invention.

As indicated in FIG. 2, the connecting portion 137a further has an assembly groove 137a3 connected to the receiving tank 137a1 and the helix groove 137a2. When assembling the protruding portion 133 and the sleeve 137, the assembly personnel can dispose the column 135 protruding from the protruding portion 133 in the helix groove 137a1 via the assembly groove 137a3, so that the protruding portion 133 is received in the receiving tank 137a1 and the column 135 is disposed in the helix groove 137a2. Referring to FIG. 3, an exploration diagram of a hinge module according to an alternate embodiment of the invention is shown. In an alternate embodiment, the protruding portion 133' and the column 135' of the hinge module 130' are two independent structures. The protruding portion 133' has a recess 133r'. The helix groove 137a2' is a through slot. The assembly personnel can dispose the protruding portion 133' in the receiving tank 137a1' first, and then inserts the column 135' to the recess 133r via the helix groove 137a2' to complete the assembly of the protruding portion 133', the column 135' and the sleeve 137'.

Figure 4A:
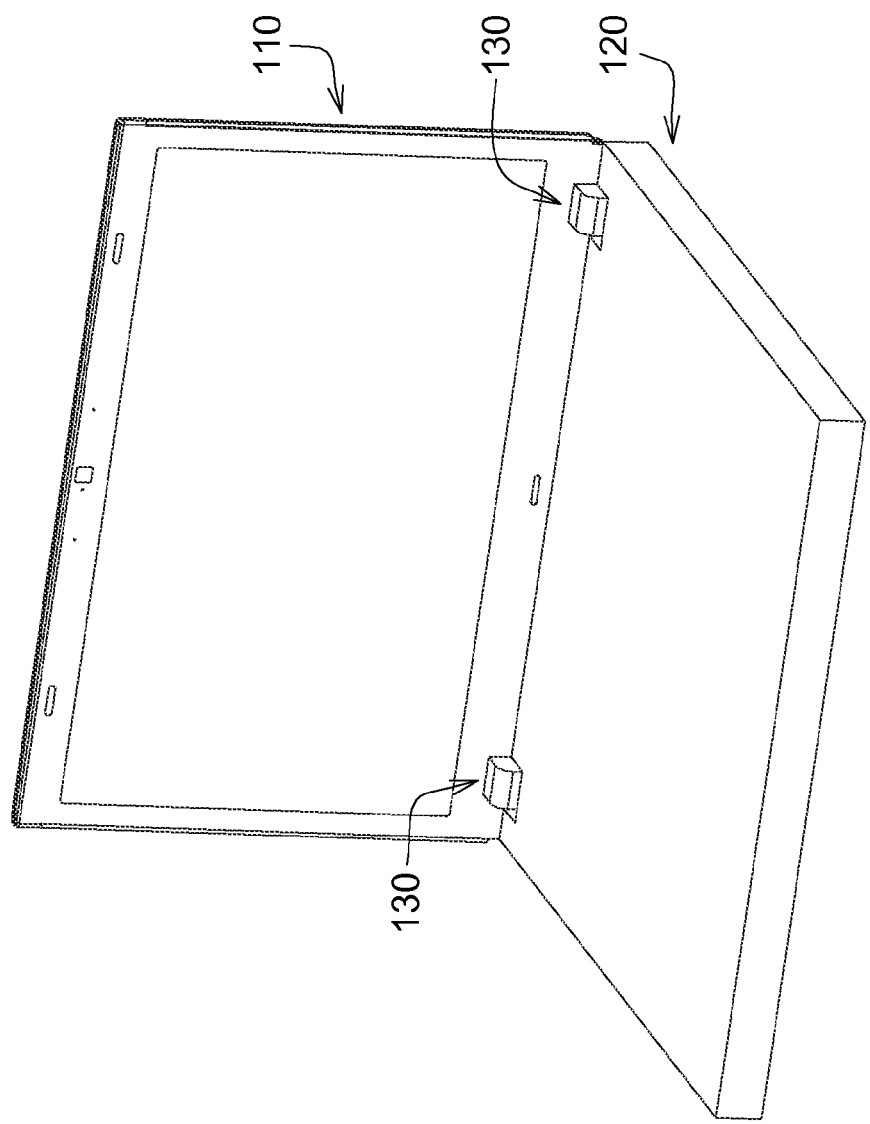
FIG. 4A shows an assembly diagram of the portable electronic device using the hinge module of FIGS. 1A and 1B.
Figure 4B:
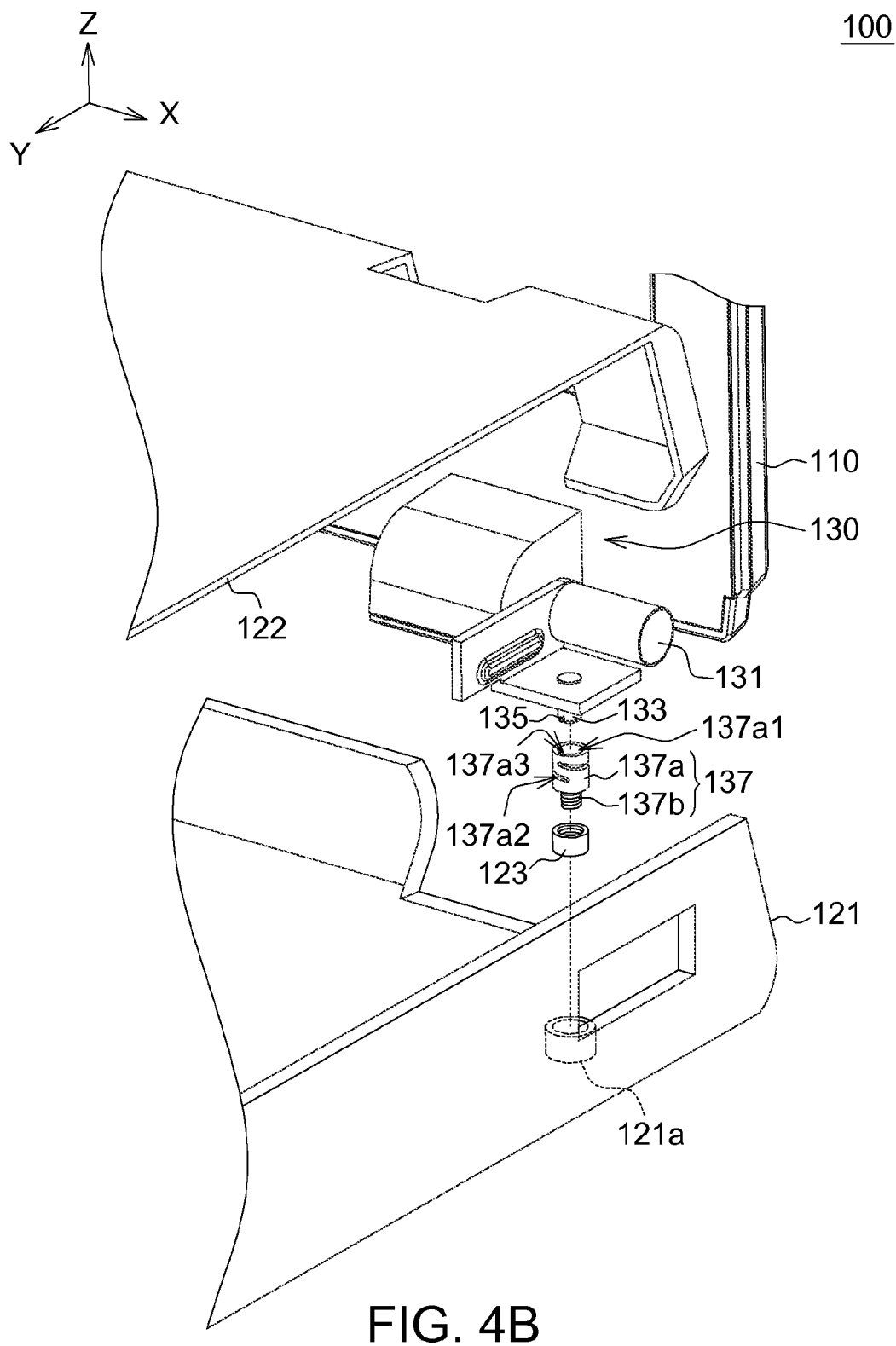
FIG. 4B shows an exploration diagram of the portable electronic device using the hinge module of FIGS. 1A and 1B.

In the following disclosure, the hinge module 130 is used in a portable electronic device. Referring to FIG. 4A and FIG. 4B. FIG. 4A shows an assembly diagram of the portable electronic device using the hinge module of FIGS. 1A and 1B. FIG. 4B shows an exploration diagram of the portable electronic device using the hinge module of FIGS. 1A and 1B. The portable electronic device 100, such as a notebook computer, includes a first mechanism 110, a second mechanism 120 and the aforementioned hinge module 130. The second mechanism 120 includes a housing 121, a housing 122 and a female thread member 123. The housing 121 has a hollowed column 121a.

Figure 5A:
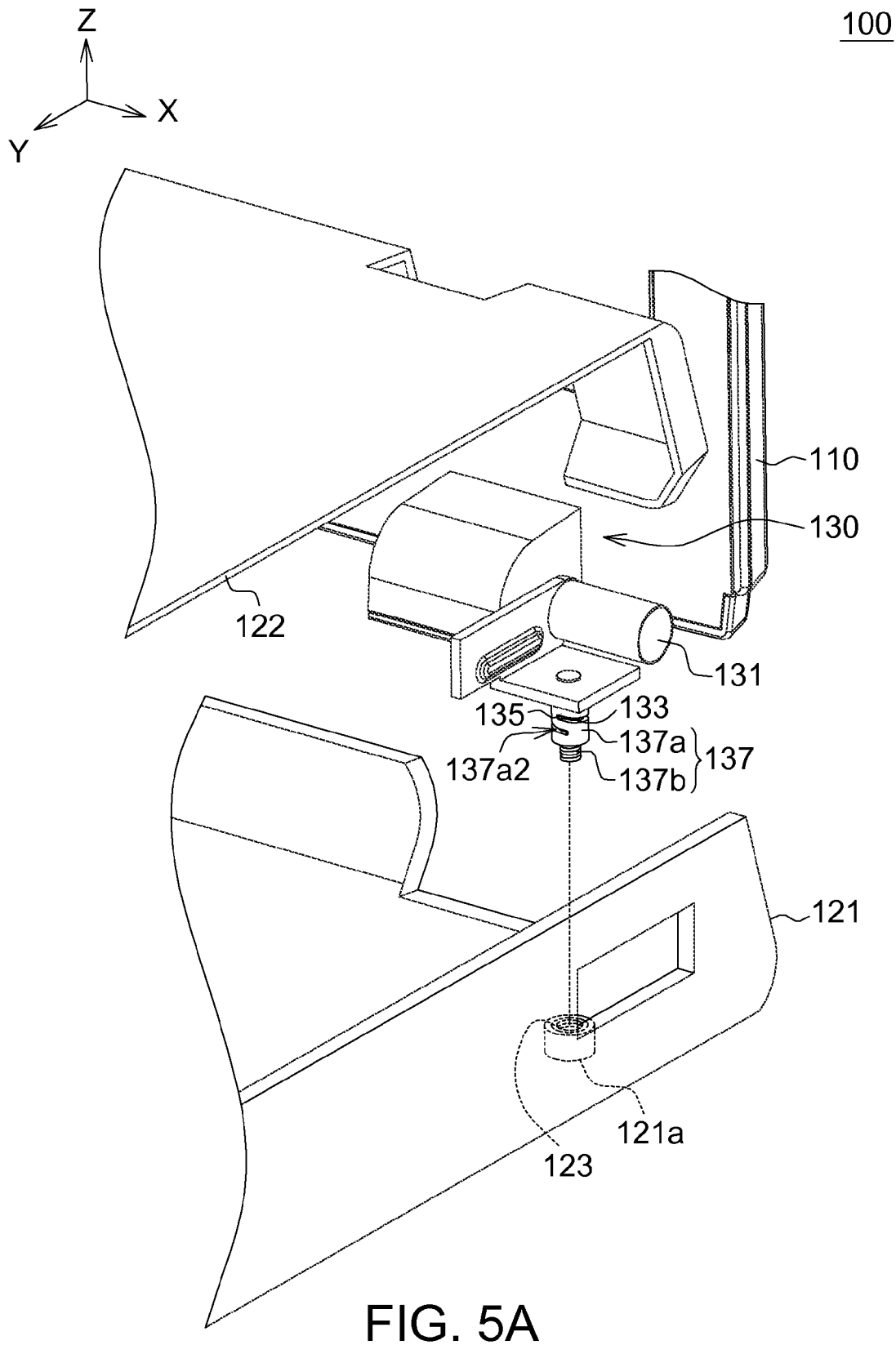
FIGS. 5A to 5C show a process for coupling the first mechanism and the second mechanism using the hinge module of FIGS. 1A and 1B.
Figure 5B:
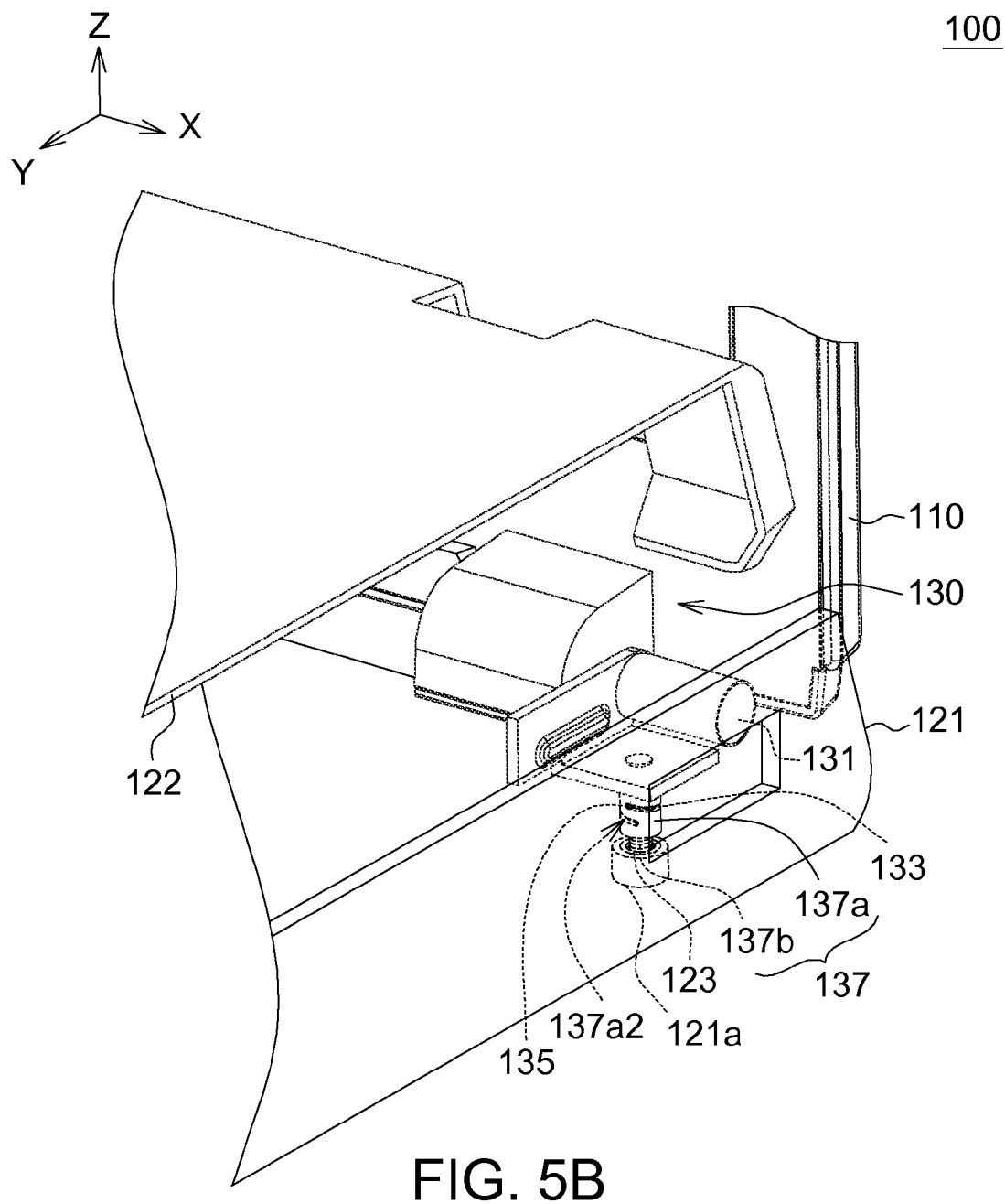
Figure 5C:
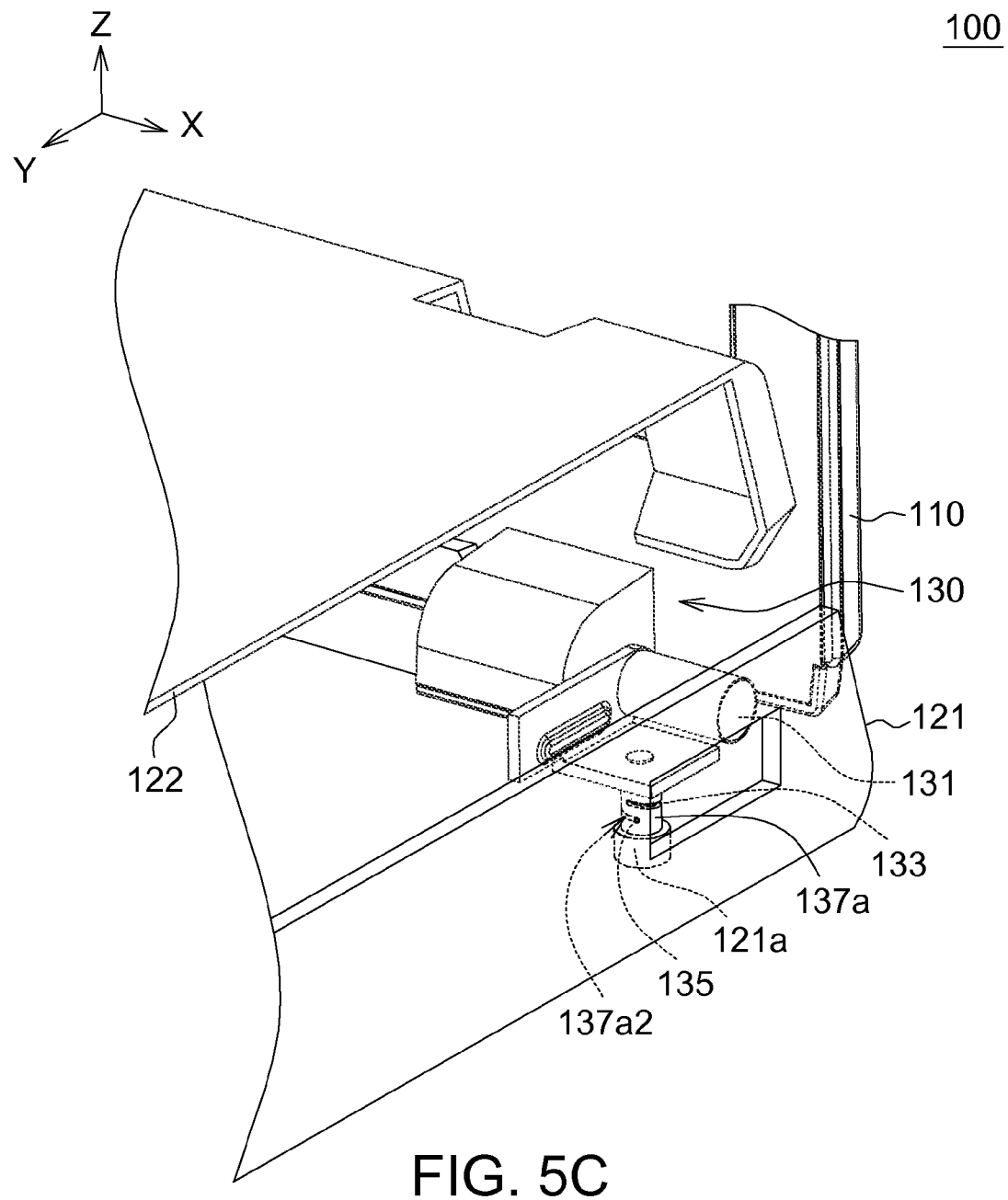

Referring to FIGS. 5A to 5C, process for coupling the first mechanism and the second mechanism using the hinge module of FIGS. 1A and 1B is shown.

As indicated in FIG. 5A, the hinge body 130 is coupled to the first mechanism 110. The female thread member 123, formed by such as screw copper particles, is fixed in the hollowed column 121a by way of thermo-melting so as to be fixed on the housing 121.

As indicated in FIG. 5B, when the assembly personnel push the first mechanism 110 and the hinge module 130 together along the −Z-axis direction, the column 135 slides along the helix groove 137a2 from one end of the helix groove 137a2, so that the sleeve 137 is rotated clockwise with respect to the protruding portion 133 (viewed towards the −Z-axis direction on the +Z-axis).

As indicated in FIG. 5C, the threaded stud portion 137b of the sleeve 137 in rotation is locked into the female thread member 123 of the hollowed column 121a which is fixed on the housing 121. Meanwhile, the column 135 is located at the other end of the helix groove 137a2. Then, the assembly personnel assemble the housing 122 and the housing 121 together, so that the hinge module 130 is clamped and positioned by the housing 121 and the housing 122 and the assembly of the portable electronic device 100 of FIG. 4A is thus completed.

When the assembly personnel would like to disassemble the portable electronic device 100, the assembly relationship between the housing 122 and the housing 121 is released first. Then, when the assembly personnel push the first mechanism 110 and the hinge module 130 together along the +Z-axis direction, the column 135 slides to the helix groove 137a2 from the other end of the helix groove 137a2 along the helix groove 137a2, so that the sleeve 137 is rotated anticlockwise with respect to the protruding portion 133 (viewed towards the −Z-axis direction on the +Z-axis). Thus, the threaded stud portion 137b of the sleeve 137 in rotation releases its locking state with the female thread member 123 of the hollowed column 121a which is fixed on the housing 121.

In an exemplification of the present embodiment of the invention, the portable electronic device 100 includes a hinge module 130. However, the portable electronic device 100 may also include the hinge module 130' of FIG. 3 for rotatably coupling the first mechanism 110 and the second mechanism 120.

The hinge module and the portable electronic device using the same disclosed in the above embodiments of the invention are locked with other object (such as a mechanism) through the cooperation of a protruding portion, a column and a sleeve so as to effectively increase assembly efficiency and production capacity.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hinge module, comprising:
   a hinge body;
   a protruding portion coupled to and protruding from the hinge body;
   a column coupled to and protruding from the protruding portion; and
   a sleeve having a connecting portion and a threaded stud portion which are connected together, wherein the connecting portion has a receiving tank and a helix groove which are connected together, the protruding portion is disposed in the receiving tank, and the column is disposed in and slides in the helix groove;
   wherein, when the column slides along the helix groove, the sleeve is rotated with respect to the protruding portion.

2. The hinge module according to claim 1, wherein the column protrudes from the protruding portion in a direction substantially perpendicular to another direction in which the protruding portion protrudes from the hinge body.

3. The hinge module according to claim 1, wherein the connecting portion further has an assembly groove connected to the receiving tank and the helix groove, and the column is disposed in the helix groove via the assembly groove.

4. The hinge module according to claim 1, wherein the protruding portion has a recess, the helix groove is a through slot, and the column is inserted into the recess via the helix groove.

5. The hinge module according to claim 1, wherein the helix groove surrounds the peripheral of the receiving tank.

6. A portable electronic device, comprising:
   a first mechanism;
   a second mechanism; and
   a hinge module, comprising:
      a hinge body coupled to the first mechanism;
      a protruding portion coupled to and protruding from the hinge body;
      a column coupled to and protruding from the protruding portion; and
      a sleeve having a connecting portion and a threaded stud portion which are connected together, wherein the connecting portion has a receiving tank and a helix groove which are connected together, the protruding portion is received in the receiving tank, and the column is disposed in and slides in the helix groove;

wherein, when the column slides along the helix groove, the sleeve is rotated with respect to the protruding portion, so that the threaded stud portion of the sleeve is locked with the second mechanism or is released from the locking state with the second mechanism.

7. The portable electronic device according to claim 6, wherein the column protrudes from the protruding portion in a direction substantially perpendicular to another direction in which the protruding portion protrudes from the hinge body.

8. The portable electronic device according to claim 6, wherein the connecting portion has an assembly groove connected to the receiving tank and the helix groove, and the column is disposed in the helix groove via the assembly groove.

9. The portable electronic device according to claim 6, wherein the protruding portion has a recess, the helix groove is a through slot, and the column is inserted into the recess via the helix groove.

10. The portable electronic device according to claim 6, wherein the helix groove surrounds the peripheral of the receiving tank.

11. The portable electronic device according to claim 6, wherein the second mechanism comprising:
 a housing; and
 a female thread member fixed on the housing, wherein the threaded stud portion of the sleeve is locked with the female thread member.

12. The portable electronic device according to claim 11, wherein the housing has a hollowed column in which the female thread member is fixed.

\* \* \* \* \*